Oct. 21, 1969                R. L. ASHBY                3,473,373
              CLUTCH REBUILDING AND TESTING MECHANISM
Filed Jan. 30, 1967                              2 Sheets-Sheet 2

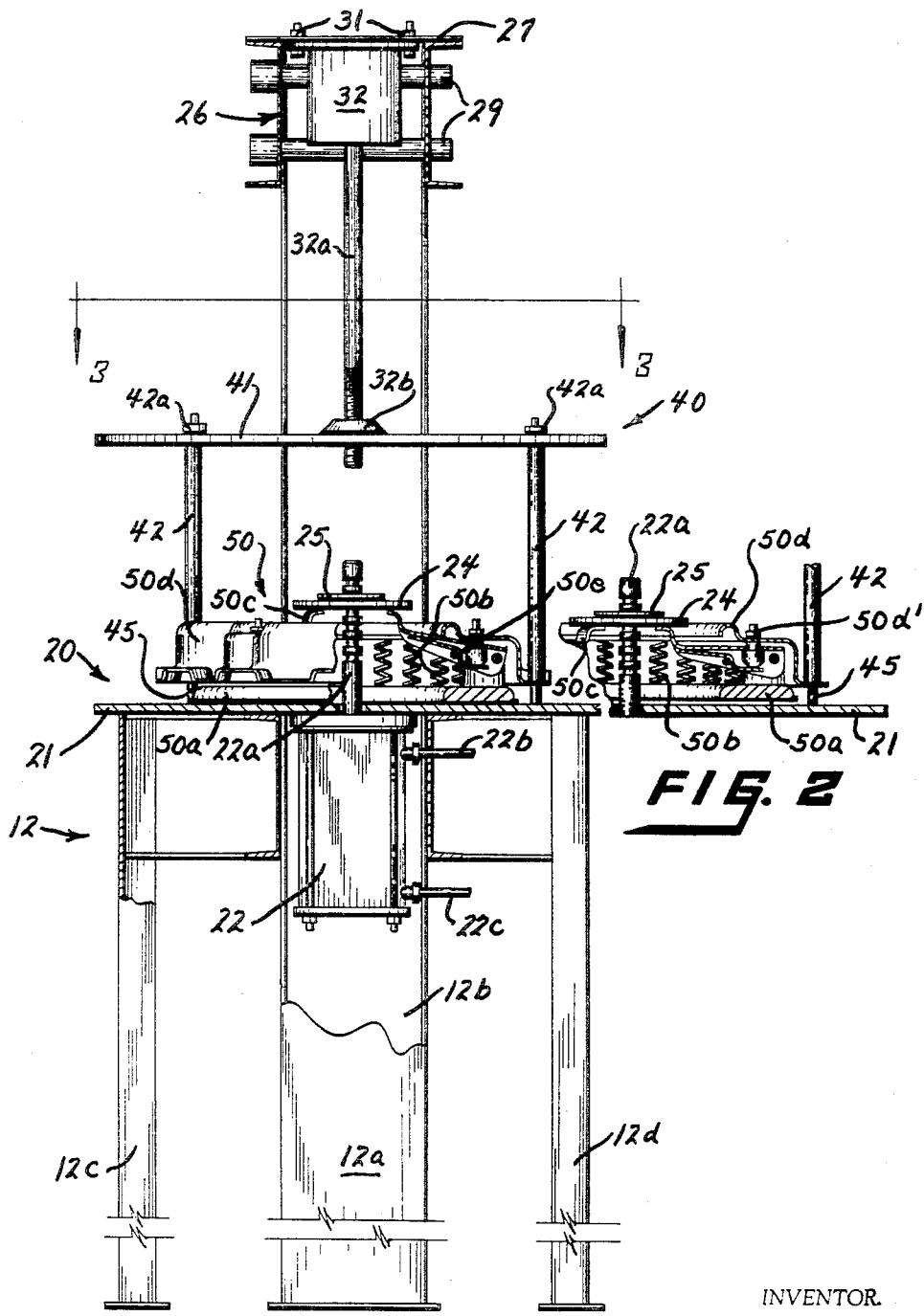

INVENTOR.
ROBERT L. ASHBY
BY
Attorney

United States Patent Office

3,473,373
Patented Oct. 21, 1969

---

3,473,373
CLUTCH REBUILDING AND TESTING MECHANISM
Robert L. Ashby, Box 123, Francisco, Ind. 47534
Filed Jan. 30, 1967, Ser. No. 612,395
Int. Cl. G01m *13/02*
U.S. Cl. 73—118          6 Claims

---

ABSTRACT OF THE DISCLOSURE

Mechanism for testing, adjusting and/or rebuilding clutches which utilizes two independent sources of power, which may act simultaneously, for accomplishing the aforesaid functions.

---

The fixtures employed heretofore in the rebuilding of clutches required considerable time and mostly hand operations in use. In this regard, and by way of example, the clutch was placed on a slotted surface plate, where, after centering, and being positioned by pressure transmitted through a center shaft by a hand operation, hold-down bolts or clamps were disposed by other hand operations along the aforesaid slots to engage the clutch cover assembly. Each of such bolts or clamps had to be threaded into position to maintain a downward positioning force on the cover assembly, so that, thereafter, the cover bolts could be removed to permit disassembly of the clutch. The preceding approach was tedious and slow, requiring one step at a time and from a single source of power.

The clutch rebuilding, adjusting and/or testing mechanism of the invention permits the rapid and effective placement of a clutch pressure plate assembly, and, through the use of an adaptor, the ready upward and downward movement of the release levers, of either a new or of a rebuilt clutch, being accomplished through two independent power sources, one exerting pressure downwardly from over the clutch pressure plate assembly and the other exerting pressure on the release levers from beneath the work table. The mechanism may be readily adapted for use on an existing hydraulic or mechanical press or in connection with independent equipment designed solely for clutch rebuilding and maintenance.

The entire operation of either rebuilding or testing is geared to fast action, minimizing the hand-controlled operations which were inherently a part of prior approaches, and doing simultaneously what previously had been accomplished one step at a time and from one source of power.

A better understanding of the invention will become more apparent from the following description, taken in conjunction with the accompanying drawings, wherein FIG. 1 is a view in end elevation, partly fragmentary and partly in section, showing the clutch rebuilding and testing mechanism of the invention, with a clutch pressure plate assembly in working position;

FIG. 2 is a fragmentary view, comparable to a portion of FIG. 1, showing the clutch release levers during testing;

Figure 3:
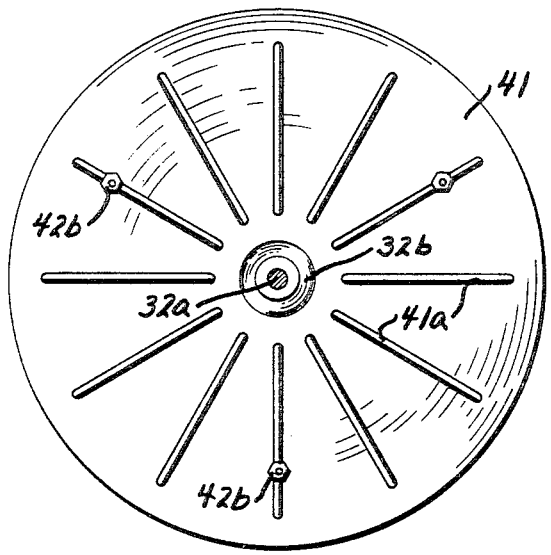
FIG. 3 is a view in horizontal section, taken at line 3—3 of FIG. 1 and looking in the direction of the arrows, showing certain details of the invention; and, FIG. 4 is a plan view, in this instance looking downwardly from left to right, or from front to back, in FIG. 1 through a plane above the clutch, showing other details of the invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to the figures, the clutch rebuilding and testing mechanism of the invention comprises a support framework 12 of any desired configuration. In the instance where the invention is adapted for use as an accessory for an existing hydraulic or mechanical press, the framework of such press serves as the support for the invention, where, on the other hand, the framework may be a part of an independent specialized clutch rebuilding and testing mechanism.

In any event, the lower portion of the framework 12 has supporting legs 12a, 12b, 12c and 12d, where such over-all structure receives a lower fixture 20, the latter being, typically, in the form of a large circular plate 21 having an axial opening therethrough. The lower fixture 20 further includes a power member 22, typically of the air type, having a movable shaft 22a extending upwardly therefrom and through the opening in the plate 21. The aforesaid shaft 22a is grooved at selected intervals, the grooves being of such size as to receive an adaptor or pressure plate 24 and, typically, a horseshoe washer 25, for reasons to be discussed herebelow. The power member 22 is connected in the usual manner to a control source through conduits 22b and 22c.

A support assembly 26 is mounted between legs 12a and 12b of the framework 12, typically being releasably positioned for vertical adjustment by slidable pins 29. Another power member 32, typically of the hydraulic type, is disposed on the undersurface of a plate 27 disposed proximate the mid-area of the support assembly 26, being secured by bolts 31. A movable shaft 32a, having a threaded end, extends downwardly from the power member 32, typically in line with the upwardly extending shaft 22a on the power member 22.

The threaded end of the shaft 32a carries an upper fixture 40, typically in the form of a circular plate 41, where a threaded member 32b completes the mounting assembly. The plate 41 includes a series of radial slots 41a (see FIG. 3), into and along which pressure rods 42, also a part of the upper fixture 40, are secured. As should be understood, the length of the radial slots 41a permits ready application of the pressure rods 42 to accommodate any size clutch, where, the pressure rods 42 are each secured into the desired position on the plate 41 by nuts 42a.

Figure 4:
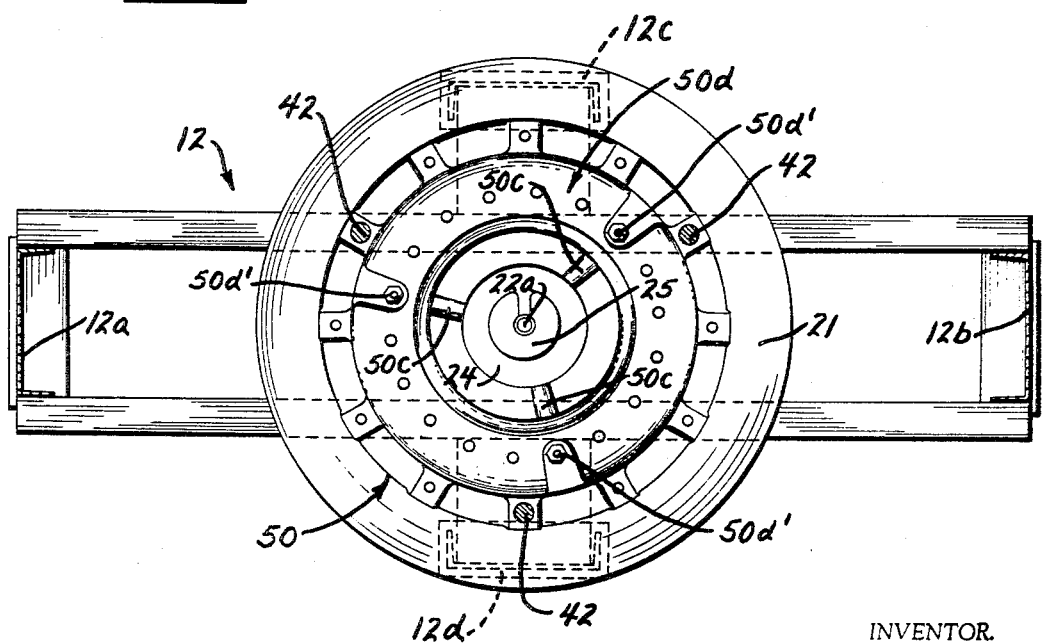

A typical clutch 50 is shown in FIGS. 1 and 4, including, in part, a pressure plate 50a, pressure springs 50b, release levers 50c, a cover 50d having cover bolts 50d', and a pivotal operating arrangement 50e for each of the release levers 50c. A series of spacers 45, beneath the cover 50d and on top of the plate 21, are provided in the use of the invention, to be discussed herebelow.

The power member 32 is driven through conventional control means, whereby the shaft 32a extending downwardly therefrom is movable through a range of positions. Either of the power members 22 or 32 may have indicating gauges (not shown) associated therewith, such being particularly important in connection with power member 22 in the testing of a clutch for maximum operating effectiveness.

In use, and typically, a clutch 50 is placed on the lower fixture 20, being centered with respect to the shafts 22a and 32a of the power members 22 and 32, respectively. Thereafter, with the plate 41 in position on the shaft 32a, the pressure rods 42 are oriented to come into contact with portions of the rim of cover 50d of the clutch 50. The spacers 45 are used beneath the rim of the cover 50d and in aligned relationship with the pressure rods 42.

After the aforesaid positioning has been accomplished, through movement of the pressure rods 42 along the slots 41a in the plate 41 (again see FIG. 3), the power member 32 is caused to operate, forcing the pressure rods 42 into contact with the cover 50d of the clutch 50 and maintaining the latter in a fixed position.

The clutch cover bolts 50d' can then be readily removed, and with the upward movement of the pressure rods 42, the cover 50d removed, without any danger of the pressure springs 50b flying into contact with the operator. In other words, the pressure rods 42 serve not only to position the clutch 50, but also to assist in the disassembly thereof through controlled upward movement.

Conversely, when it is desired to reassemble the clutch 50, after replacement of parts or rebuilding, for example, the pressure rods 42 force the cover assembly into position, against the force of the pressure springs 50b, so that the cover bolts 50d' can be secured, and the clutch 50 made ready for further use.

In the instance of testing a reworked or even a new clutch, the pressure plate 24 and horseshoe washer 25 are secured into a desired groove along the shaft 22a of the power member 22. Thereafter, and with the clutch 50 positioned through pressure rods 42, as described hereabove, the shaft 22a of the power member 22 is caused to move downwardly, so that the release levers 50c travel from the position of FIG. 1 to the position of FIG. 2. With the use of a conventional gauge (not shown), the release levers 50c are checked to determine if the desired clutching pressure is available.

From the preceding, it should be evident that the invention provides a simple, fast, and effective approach to rebuilding, adjusting, and/or testing a clutch. The use of the two independent power members, acting simultaneously, eliminates the time-consuming hand operations prevalent in techniques employed heretofore. Not only does the invention expedite the desired clutch operations, but, additionally, safety and versatility is provided.

The mechanism is susceptible to various changes within the spirit of the invention. For example, the plate 21 may assume other plan configurations, as well as the pressure plate 24. Additionally, instead of being integral, the power member 22 may be combinable with the plate 21. Moreover, mechanical screws, for example, might be employed as the power members. As discussed, the invention has important adaptability to either existing hydraulic or mechanical presses or as a separate and independent mechanism in a free standing framework, achieving, in any such instance, desirable end results. Thus, the above description should be considered illustrative, and not as limiting the scope of the following claims.

I claim:

1. A clutch rebuilding and testing mechanism comprising a framework, a receiving surface for said clutch on said framework, a power member having a power shaft mounted on said framework, a support member mounted on said power shaft, and pressure members depending from said support member selectively engageable with said clutch upon activation of said power member, said support member having slotted portions along which said pressure members are slidable and releasably secured.

2. The clutch rebuilding and testing mechanism of claim 1 where said power member is a hydraulic cylinder.

3. The clutch rebuilding and testing mechanism of claim 1 where said clutch receiving surface has a centrally disposed opening, and where a power shaft of another power member extends through said opening.

4. The clutch rebuilding and testing mechanism of claim 3 where said power shaft of said another power member has grooved portions therealong, and where a pressure member is removably retained in one of such grooved portions and selectively engageable with said clutch upon activation of said another power member.

5. The clutch rebuilding and testing mechanism of claim 3 where said another power member is an air cylinder.

6. The clutch rebuilding and testing mechanism of claim 3 where said power member and said another power member act simultaneously.

References Cited

UNITED STATES PATENTS

| 1,749,573 | 3/1930 | Earhart. |
| 2,044,067 | 6/1936 | Eldridge et al. |
| 2,845,846 | 10/1958 | Kaderly _____ 73—161 X |

RICHARD C. QUEISSER, Primary Examiner

JERRY W. MYRACLE, Assistant Examiner